Dec. 9, 1952 G. W. GRAY 2,621,289

FREQUENCY CHANGING SYSTEM

Filed April 19, 1949

INVENTOR
George W. Gray
BY H. H. Newton
ATTORNEY

Patented Dec. 9, 1952 2,621,289

UNITED STATES PATENT OFFICE 2,621,289

FREQUENCY CHANGING SYSTEM

George W. Gray, Lambertville, N. J., assignor to Radio Corporation of America, a corporation of Delaware Application April 19, 1949, Serial No. 88,307

13 Claims. (Cl. 250—20)

This invention relates to frequency changing systems, and particularly to a circuit arrangement for converting a carrier wave, modulated in accordance with a signal and having a predetermined relatively high frequency, into a similarly modulated wave having a relatively low frequency.

It is the general practice, particularly in radio receivers, to convert the frequency of the received carrier wave of radio frequency into one of a lower or intermediate frequency for additional amplification before demodulation. The lower frequency customarily is fixed, so that the amplifying circuits may be pretuned. One of the more conventional systems for converting the received carrier wave into one of lower frequency employs a local oscillator, the output of which is combined with the received signal-modulated wave according to the well known heterodyning principle, whereby sum and difference frequencies are produced. In systems of this character, it is necessary, in order to produce a fixed intermediate frequency into which the received radio frequency wave is to be converted, to provide facilities for varying the frequency-determining circuits of the local oscillator whereby to correspondingly vary the frequency of its output.

In systems of this character, there are always encountered the problems of securing the required tracking between the tuning devices associated, respectively, with the local oscillator and with the radio frequency amplifying circuits, and of coping with the so-called image frequencies which are produced. Proper tracking usually is secured by the use of trimmer condensers, for example. In order that the image frequencies may not interfere with the successful operation of the receiver, it is necessary to provide image frequency rejection circuits. The provision of these facilities not only complicates the circuit structure of the receiver, but also adds materially to the costs of producing such a receiver.

Therefore, it is an object of the present invention to provide a novel circuit arrangement for producing, from an input wave of relatively high frequency, an output wave which is substantially of undistorted sine wave form and which has a relatively low frequency.

Another object of the invention is to provide, in a circuit arrangement of the above character, improved means for producing an output wave having a frequency which is a relatively small fraction of the frequency of the input wave and which is modulated in amplitude in accordance with the input wave.

Another object of the invention is to provide a frequency changing system which will invariably reduce the frequency of an input wave and which is not dependent upon the tuning of any circuits which may be used for amplifying the input wave.

A further object of the invention is to provide a frequency changing system employing a gating device whereby only predetermined selected portions of the input wave are effective to produce a wave of lower frequency than that of the input wave.

Still another object of the invention is to provide a frequency changing system employing a gating device functioning to select portions of the input wave for the production of a wave of lower frequency than that of the input wave, and in which the gating device is controlled by a local source of oscillations having the lower frequency.

A still further object of the invention is to provide a frequency changing system employing a gating device for selectively utilizing portions of the input wave for the production of the wave of lower frequency than that of the input wave, and in which the gating device is controlled by energy derived from the wave of lower frequency.

According to the present invention, there is provided a frequency changing system particularly suited for use in the conversion of an amplitude-modulated carrier wave of predetermined frequency into a correspondingly modulated carrier wave of lower frequency, and which includes a gating device which is periodically rendered operative to permit selected portions of the input wave to be impressed upon a circuit for the generation of impulses at a lower frequency than that of the input wave. The generated impulses, in turn, are impressed upon a wave forming device, such as a circuit or network tuned for resonance at the lower frequency and capable of converting the impulses into a substantially sinusoidal wave modulated in accordance with the signals which are impressed upon the input wave of higher frequency. The sinusoidal wave thus developed is finally impressed upon a suitable utilization circuit for subsequent amplification and/or demodulation. The operation of the gating device is controlled by an unmodulated periodic wave having the lower frequency of the developed wave. In this manner, the gating device is alternately rendered conducting and nonconducting at the lower frequency of the developed wave.

In accordance with one of the embodiments of the invention illustrated herein, the control voltage for the gating device is derived from a local oscillator, the frequency-determining circuits of which are adjusted in such a manner as to effect the generation of a wave of the lower frequency.

In another form of the invention disclosed herein, the control voltage for the gating device is derived from the developed wave of lower frequency. This wave may be produced by coupling the output circuit of the wave forming device to suitable amplitude-limiting means whereby to remove all signal modulation from the developed wave of lower frequency. The limiting device may then be suitably coupled to the control circuit of the gating device.

The novel features that are considered characteristic of this invention are set forth with particularity in the appended claims. The invention itself, however, both as to its organization and method of operation, as well as additional objects and advantages thereof, will best be understood from the following description, taken in connection with the accompanying drawing, of which:

Figure 1:
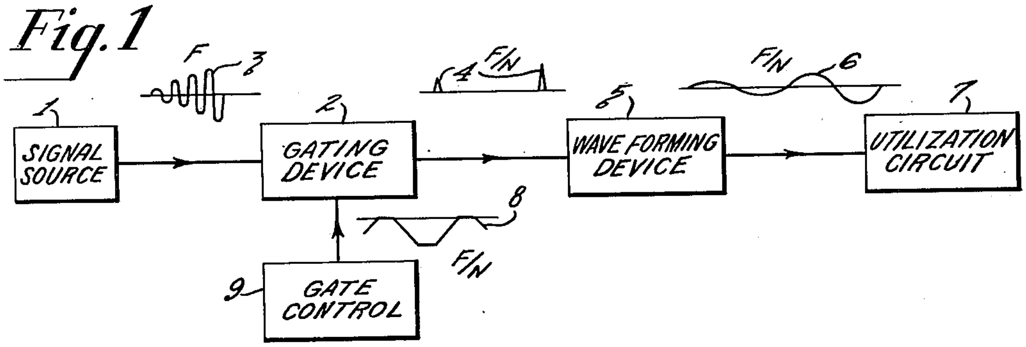
Figure 1 is a block diagram of a frequency changing system according to the invention.

Referring, first, to Figure 1 of the drawing, there is shown, in block diagram form, an embodiment of the invention including its essential components. A signal source 1, which may be the output of a radio frequency amplifier of a radio receiver, or any other suitable source of a carrier wave modulated by an intelligence signal, is coupled to the input circuit of a gating device 2. It will be assumed that the carrier wave of relatively high frequency is amplitude-modulated by the signal. The portion of such a wave, represented at 3, having a frequency F, is typical of the wave form which is impressed upon the input circuit of the gating device. This device is periodically rendered conductive at the desired lower frequency, and also includes means for generating in its output circuit a series of impulses such as represented at 4. These impulses are generated at a lower frequency $F/N$, where N is substantially any factor. The amplitude of the impulses 4 varies in accordance with the amplitude modulation of the input wave, and said impulses are impressed upon the input circuit of a wave forming device 5 by means of a coupling between the input circuit and the output circuit of the gating device 2. The wave forming device includes means for converting the impulses 4 into a substantially sinusoidal wave having the desired lower frequency $F/N$ and being modulated in amplitude in accordance with the signal. Such a wave is illustrated at 6. The output circuit of the wave forming device 5 is coupled to the input circuit of a suitable utilization circuit 7.

In order that the gating device be made to function in the desired manner, it has applied thereto a control voltage such as that represented at 8, having the lower frequency $F/N$ and being suitably polarized to effect the desired operation of the gating device. Such a voltage is derived from a gate control circuit 9.

Figure 2:
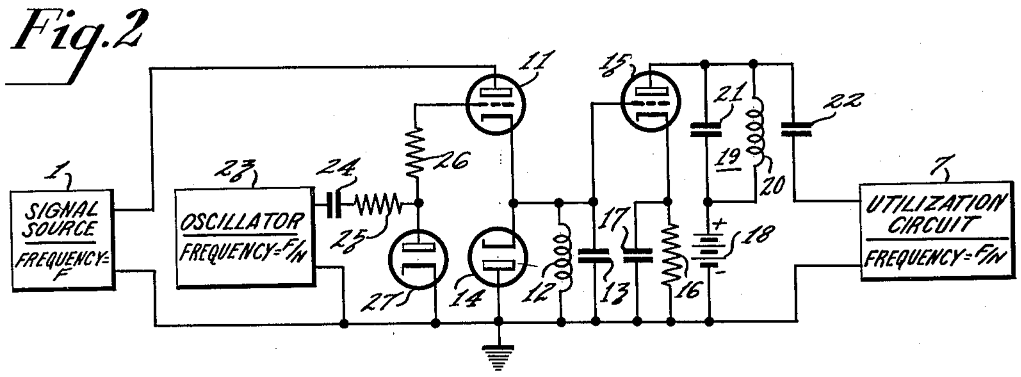
Figure 2 is a schematic diagram of an embodiment of the invention employing a local fixed frequency oscillator for the control of the gating device.

Having reference to Figure 2 of the drawing, there is shown a schematic circuit diagram of an embodiment of the invention in which the gate control voltage is derived from a local oscillator having a fixed lower frequency $F/N$. The signal source 1 is coupled to the anode of a triode vacuum tube 11, forming part of the gating device. The cathode of the tube 11 is coupled to ground through an impulse forming circuit including a coil or inductor 12, which may be shunted by a condenser 13 by means of which the coil may be tuned or resonated at the lower frequency. A diode 14 also is coupled between the cathode of the tube 11 and ground. The diode is poled, as shown, and serves the purpose of preventing the cathode of the tube 11 from being driven negative with respect to ground.

The cathode of the tube 11 is coupled to the control grid of a vacuum tube 15, included as one component of the wave forming device. A suitable self-bias for this tube is obtained by the connection of the cathode thereof to ground, through a resistor 16 which is bypassed for alternating currents by a condenser 17. Space current for the tube 15 is derived from a suitable source of unidirectional energy, such as that represented by the battery 18. The positive terminal of the battery is connected to the anode of the tube 15 through a resonant circuit 19 comprising the parallel connection of a coil or inductor 20 and a condenser 21. The circuit 19 is tuned for resonance at the lower frequency $F/N$.

The output circuit of the wave forming device is coupled to the utilization circuit 7 by means of a condenser 22 connected between the utilization circuit and the anode of the tube 15.

The gate control circuit includes a local oscillator 23, by means of which there is produced an unmodulated control wave having the lower frequency $F/N$. The output circuit of the oscillator 23 is coupled, by means of a condenser 24 and the serially connected resistors 25 and 26, to the control grid of the gating tube 11. A diode 27 also is connected, in the polarity shown, from the junction point between resistors 25 and 26 to ground, for the purpose of preventing the control grid of the tube 11 from being driven positive with respect to ground.

Referring now to the operation of the embodiment of the invention shown in Figure 2, it will be understood that an amplitude-modulated carrier wave of the character shown at 3 in Figure 1, having a predetermined relatively high frequency, is impressed upon the anode of the gating tube 11. During periods when the control grid of this tube is suitably energized under the control of the oscillator 23, the tube 11 becomes momentarily conductive, so as to permit selected portions of the input wave to be impressed upon the impulse forming circuit connected to its cathode. These pulses, in turn, are impressed upon the control grid of the amplifier tube 15, by which they may be amplified and impressed upon the resonant circuit 19, which thereby is suitably excited to develop a substantially sinusoidal wave. By reason of the fact that the impulses at the lower frequency which are impressed upon the tube 15 are modulated in amplitude in accordance with the signal, the wave of lower frequency which is developed in the resonant circuit 19 also is correspondingly modulated in amplitude.

Figure 3:
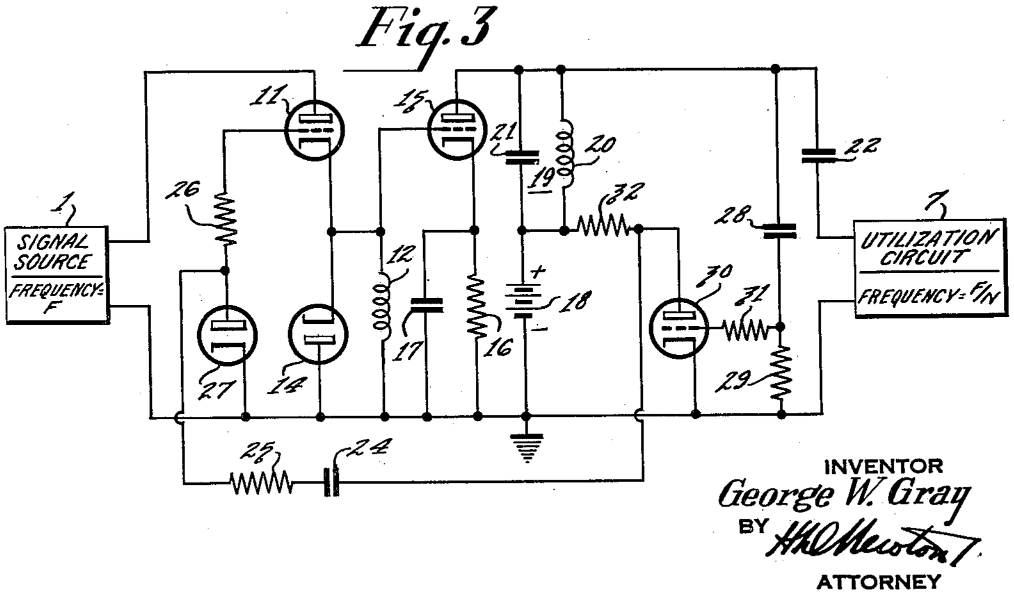
Figure 3 is a schematic circuit diagram of another embodiment of the invention, in which the control voltage for the gating device is derived from the developed wave of lower frequency.

Referring now to Figure 3 of the drawings, there will be described another embodiment of the invention in which the control of the gating device is effected by the generated wave of lower frequency. As in the previously described modification, the signal source 1 is coupled to the anode of the gating tube 11. The cathode of this tube is connected to ground by a coil 12, which, in this instance, may be untuned. The wave forming device, including the tube 15 and the resonant circuit 19, may be identical with the form of the invention shown in Figure 2, and also may be similarly coupled to the utilization circuit 7.

In the present form of the invention, however, the output of the wave forming device derived from the anode of the tube 15 is coupled by a condenser 28 having a leak resistor 29 to the control grid of an amplitude-limiting amplifier tube 30, through a grid current-limiting resistor 31. Space current for the tube 30 is derived from the battery 18 through a load resistor 32. The anode of the limiting amplifier tube 30 is coupled to the control grid of the tube 11, in a manner similar to that in which the oscillator 23 is connected to this electrode in the embodiment shown in Figure 2.

Referring to the operation of the embodiment of the invention shown in Figure 3, it will be understood that there is produced at the anode of the tube 15 of the wave forming device a sinusoidal voltage wave having the lower frequency $F/N$ and modulated in amplitude in accordance with the signal. A voltage of this character is not adapted for use in such a form for the control of the gating tube 11, for the reason that the amplitude modulation of the wave would tend to produce an undesired singing effect. Consequently, before this wave may be utilized for the purpose of controlling the gating tube 11, it is impressed upon the limiting amplifier tube 30. This tube is operated at a point on its characteristic which is sufficiently close to the saturation level that it functions to limit the amplitude of the voltage developed in its output circuit at a predetermined level. Such tubes are conventional and their uses for such purposes are well known to those skilled in the art and, therefore, it is considered unnecessary to describe in any further detail the operation of the tube 30. Suffice it to say, that the voltage wave developed at the anode of the tube 30 is unmodulated in amplitude and has the desired lower frequency $F/N$. By means of the described circuit coupling the anode of the tube 30 to the control grid of the tube 11, this latter tube is rendered alternately conductive and non-conductive, so as to selectively transmit only portions of the relatively high frequency input wave to the impulse forming circuit associated with the tube at the desired lower frequency.

It will be appreciated that, while certain precautions, such as those taken to prevent singing, have to be taken in the form of the invention shown in Figure 3, this embodiment of the invention does have certain advantages over the embodiment shown in Figure 2. In the system of Figure 3, the lower frequency necessarily is an exact sub-harmonic of the input frequency. The system, thus, is a frequency divider where the factor N is an integer. In order to effect the development of a fixed subharmonic frequency by means of the apparatus shown in Figure 2, however, it is necessary not only to employ, as the oscillator 23, one having its frequency stabilized by means such as a crystal, but also to have available as the signal source 1, one which has an invariable frequency. In the form of the invention shown in Figure 3, on the other hand, no such facilities have to be provided. The sub-harmonic frequency is fixed by the parameters of the resonant circuit 19. However, the system of Figure 2 is not restricted to a sub-harmonic relationship of the lower frequency to that of the input wave.

It also is to be understood that the invention is not necessarily limited to that type of operation of the gating tube 11 whereby only one half-cycle of the input wave per conducting period of the tube 11 is utilized for the production of the exciting or driving impulses for the resonant circuit 19. It is considered to be within the scope of the present invention to periodically render the gating tube 11 conducting for sufficiently long periods to enable several successive half-cycles of the input wave to be transmitted to the impulse forming circuits during each conducting period. In this connection, it will be appreciated that it is necessary only to limit the number of successive half-cycles transmitted to the impulse forming circuits, so that the ratio of the number of these half-cycles to the number of half-cycles which are not transmitted is preferably less than one.

Thus, it may be considered that the device operates so as to select a number of successive half-cycles from the input wave of relatively high frequency during each of a succession of operative intervals of the gating tube. These intervals occur at the lower frequency of the developed wave and each has a short time duration relative to the period of the wave of lower frequency. The selected half-cycles, when impressed upon an impulse forming circuit, are formed into a series of time-spaced impulses having the lower frequency and an amplitude variation which corresponds with the signal modulation of the input wave of relatively high frequency. These impulses then are formed into a substantially sinusoidal wave having an amplitude modulation corresponding to the signal modulation of the input wave and also having the desired lower frequency.

What is claimed is:

1. A frequency changing system for a carrier wave comprising, a source of a carrier wave of predetermined frequency modulated in amplitude by an intelligence signal, a gating tube having an anode, a cathode and a control grid, means coupling said source to the anode of said gating tube, a first parallel resonant circuit tuned to a frequency lower than said predetermined frequency and coupled to the cathode of said gating tube, an amplifier tube having input and output terminals, means coupling the input terminals of said amplifier tube to said first parallel resonant circuit, a second resonant circuit tuned to said lower frequency and coupled to the output terminals of said amplifier tube, a source of an unmodulated wave having said lower frequency coupled to the control grid of said gating tube to render said gating tube intermittently operative for successive periods recurring at said lower frequency and each of short time duration relative to the period of said wave of lower frequency, and means including two diodes, one of said diodes being connected to the control grid of said gating tube and the other of said diodes being connected to the cathode of said gating tube in such polarities as to prevent the development at said grid of a positive potential relative to said cathode.

2. A frequency changing system for a carrier wave comprising, a source of a carrier wave of predetermined frequency modulated in amplitude by an intelligence signal, a gating tube having an anode, a cathode and a control grid, means coupling said source to the anode and cathode of said gating tube, a first parallel resonant circuit tuned to a frequency lower than said predetermined frequency and coupled to the cathode of said gating tube, an amplifier tube including an anode, a cathode and a control grid, means coupling the control grid of said amplifier tube to the first parallel resonant circuit of said gating tube, a resonant circuit tuned to said lower frequency and coupled between the anode and cathode of said amplifier tube, a source of an unmodulated wave having said lower frequency coupled between the control grid and cathode of said gating tube to render said gating tube intermittently operative for successive periods recurring at said lower frequency and each of short time duration relative to the period of said wave of lower frequency, and means cooperating with said unmodulated wave source and including two diodes, one of said diodes being connected to the control grid of said gating tube and the other of said diodes being connected to the cathode of said gating tube in opposite polarities so as to prevent the development at said grid of a positive potential relative to said cathode.

3. A frequency changing system for a signal-modulated carrier wave comprising, a source of a carrier wave of predetermined frequency modulated in accordance with an intelligence signal, impulse generating means including an electronic gating tube having an anode, a cathode, and a control grid, said anode being coupled to said source, an amplifier tube having an input circuit coupled to the output circuit of said impulse generating means and an output circuit including a resonant network tuned to a frequency which is lower than said predetermined frequency means independent of said resonant circuit for producing an unmodulated wave having said lower frequency coupled to the control grid of said gating tube, and means including two diodes, one of said diodes being connected to the control grid of said gating tube and the other of said diodes being connected to the cathode of said gating tube in such polarities as to prevent the development at said grid of a positive potential relative to said cathode.

4. A frequency changing system for a carrier wave comprising, a source of a carrier wave of predetermined frequency modulated in amplitude by an intelligence signal, an impulse generator including a gating tube having an anode, a cathode and a control grid and a first resonant circuit coupled to the cathode of said gating tube and tuned to a frequency which is lower than said predetermined frequency, said impulse generator having an input circuit coupled to said source, an amplifier having its input circuit coupled to said first resonant circuit of said impulse generator, the output circuit of said amplifier including a second resonant network tuned to said lower frequency to develop in said second resonant network substantially sinusoidal oscillations at said lower frequency modulated in amplitude in accordance with said signal, a local oscillator producing an unmodulated wave having said lower frequency, and biasing means coupled between the output circuit of said oscillator and the control grid of said gating tube to render said gating tube operative intermittently at said lower frequency, said biasing means including two diodes, one of said diodes being connected to the control grid of said gating tube and the other of said diodes being connected to the cathode of said gating tube in such polarities as to prevent the development at said grid of a positive potential relative to said cathode.

5. A frequency changing system for a carrier wave comprising, a source of a carrier wave of predetermined frequency modulated in amplitude by an intelligence signal, a gating tube having an anode, a cathode and a control grid, means coupling said source to the anode and cathode of said gating tube, an impulse-forming resonant circuit coupled to the cathode of said gating tube, an amplifier tube including an anode, a cathode and a control grid, means coupling the control grid of said amplifier tube to the impulse-forming circuit of said gating tube, a further resonant circuit tuned to a frequency lower than said predetermined frequency and coupled between the anode and cathode of said amplifier tube, an independent source of an unmodulated wave having said lower frequency coupled to the control grid of said gating tube to render said gating tube intermittently operative for successive periods recurring at said lower frequency and each of short time duration relative to the period of said wave of lower frequency, and means including two diodes, one of said diodes being connected to the control grid of said gating tube and the other of said diodes being connected to the cathode of said gating tube in such polarities as to prevent the development at said grid of a positive potential relative to said cathode.

6. A frequency changing system for a signal-modulated carrier wave comprising, a source of a carrier wave of predetermined frequency modulated in accordance with an intelligence signal, an impulse generator including a gating tube having its anode coupled to said source, a wave forming device having its input circuit coupled to the cathode of said gating tube and including a resonant circuit tuned to a frequency which is lower than said predetermined frequency, a limiter having an input circuit coupled to said wave forming device and an output circuit in which is developed an unmodulated wave at said lower frequency, and control means coupling the output circuit of said limiter to the control grid of said gating tube for impressing said unmodulated wave upon said gating tube to render said impulse generator operative at said lower frequency.

7. A frequency changing system for a signal-modulated carrier wave comprising, a source of a carrier wave of predetermined frequency modulated in accordance with an intelligence signal, impulse generating means including an electronic gating tube and having its anode coupled to said source, a wave forming amplifier having its input circuit coupled to the output circuit of said impulse generating means and including a resonant network tuned to a frequency which is lower than said predetermined frequency, an amplitude-limiter having an input circuit coupled to said wave forming amplifier and an output circuit in which is developed an unmodulated wave at said lower frequency, and frequency-controlling means coupling the output circuit of said limiter to the control grid of said gating tube for impressing said unmodulated wave upon said gating tube to render said impulse generating means operative for the generation of impulses intermittently at said lower frequency.

8. A frequency changing system for a carrier wave comprising, a source of a carrier wave of predetermined frequency modulated in amplitude by an intelligence signal, impulse generating means including a gating tube having an anode, a cathode and a control grid, said anode being coupled to said source, an amplifier having its input circuit coupled to the cathode of said gating tube, the output circuit of said amplifier including a resonant network tuned to a frequency which is lower than said predetermined frequency, an amplitude-limiting vacuum tube having its control grid coupled to the output circuit of said amplifier and having an output circuit in which is developed an amplitude-limited wave at said lower frequency, and biasing means coupled between the output circuit of said limiting tube and the control grid of said gating tube to render said gating tube operative for the generation of impulses intermittently at said lower frequency.

9. A frequency changing system for a carrier wave comprising, a source of a carrier wave of predetermined frequency modulated in amplitude by an intelligence signal, an impulse generator including a grid-controlled gating tube having an anode, a cathode and a control grid said anode being coupled to said source, an amplifier having its input circuit coupled to the output circuit of said impulse generator, the output circuit of said amplifier including a resonant network tuned to a frequency which is lower than said predetermined frequency, an amplitude-limiting vacuum tube having a control grid coupled to said resonant network and having an output circuit in which is developed an amplitude-limited wave at said lower frequency, and biasing means coupled to the output circuit of said limiting tube and to the control grid of said gating tube to render said gating tube operative intermittently at said lower frequency, said biasing means including two diodes, one of said diodes being connected to the control grid of said gating tube and the other of said diodes being connected to the cathode of said gating tube in such polarities as to prevent the development at said grid of a positive potential relative to said cathode.

10. A frequency divider for a carrier wave comprising, a source of a carrier wave of fundamental frequency modulated in amplitude by an intelligence signal, a gating tube having an anode, a cathode and a control grid, means coupling said source to the anode and cathode of said gating tube, an impulse-forming circuit coupled to the cathode of said gating tube, an amplifier tube including an anode, a cathode and a control grid, means coupling the control grid of said amplifier tube to the impulse-forming circuit of said gating tube, a resonant circuit tuned to a sub-harmonic frequency of said fundamental frequency and coupled between the anode and cathode of said amplifier tube to convert said impulses into a wave having said sub-harmonic frequency and modulated in amplitude in accordance with said signal, means including an amplitude-limiting device coupled to said resonant circuit for developing an unmodulated wave having said sub-harmonic frequency, means coupling said amplitude-limiting device to the control grid of said gating tube to render said gating tube intermittently operative for successive periods recurring at said sub-harmonic frequency and each of short time duration relative to the period of said wave of sub-harmonic frequency, and means including two diodes, one of said diodes being connected to the control grid of said gating tube and the other of said diodes being connected to the cathode of said gating tube in such polarities as to prevent the development at said grid of a positive potential relative to said cathode.

11. A frequency changing system for a carrier wave comprising, a source of a carrier wave of predetermined frequency modulated in amplitude by an intelligence signal, a gating tube having an anode, a cathode, and a control grid, an output circuit coupled to said cathode and an input circuit coupled between said source and the anode of said gating tube, an amplifier having an input circuit coupled to the output circuit of said gating tube, the output circuit of said amplifier including a resonant network tuned to a frequency which is lower than said predetermined frequency, a source of an unmodulated wave having a frequency lower than said predetermined frequency, and biasing means coupled between said unmodulated wave source and the control grid of said gating tube to render said gating tube operative intermittently at said lower frequency, said biasing means including two diodes, one of said diodes being connected to the control grid of said gating tube and the other of said diodes being connected to the cathode of said gating tube in such polarities as to prevent the development at said grid of a positive potential relative to said cathode.

12. A frequency changing system for a signal-modulated carrier wave comprising, a source of a carrier wave of predetermined frequency modulated in accordance with an intelligence signal, an impulse generator including a gating tube having an anode, a cathode, and a control grid said anode being coupled to said source, a resonant circuit tuned to a frequency lower than said predetermined frequency and coupled to the cathode of said gating tube, an amplifier tube having an anode, a cathode and a control grid, means coupling the control grid of said amplifier tube to said resonant circuit, means independent of said resonant circuit for producing an unmodulated control wave of said lower frequency coupled to the control grid of said gating tube, and means including two diodes, one of said diodes being connected to the control grid of said gating tube and the other of said diodes being connected to the cathode of said gating tube in such polarities as to prevent the development at said grid of a positive potential relative to said cathode.

13. A frequency changing system for a signal-modulated carrier wave comprising, a source of a carrier wave of predetermined frequency modulated in amplitude by an intelligence signal, an impulse generator including a gating tube having an anode, a cathode, and a control grid, said anode being coupled to said source, an amplifier having an input circuit coupled to the cathode of said gating tube, the output circuit of said amplifier including a resonant network tuned to a frequency which is lower than said predetermined frequency to develop in said resonant network substantially sinusoidal oscillations at said lower frequency and modulated in amplitude in accordance with said signal, a wave generator independent of said resonant circuit for producing an unmodulated wave having said lower frequency, and biasing means including two diodes, one of said diodes being connected to the control grid of said gating tube and the other of said diodes being connected to the cathode of said gating tube in such polarities as to prevent the development at said grid of a positive potential relative to said cathode.

GEORGE W. GRAY.

REFERENCES CITED

The following references are of record in the file of this patent:

UNITED STATES PATENTS

| Number | Name | Date |
|---|---|---|
| 2,266,670 | Winfield | Dec. 16, 1941 |
| 2,277,000 | Bingley | Mar. 17, 1942 |
| 2,361,437 | Trevor | Oct. 31, 1944 |
| 2,445,161 | Vogel | July 13, 1948 |
| 2,477,585 | Dodington | Aug. 2, 1949 |
| 2,480,599 | Oxford | Aug. 30, 1949 |